Feb. 11, 1969  H. E. GAUSS ET AL  3,427,038
SHOCK MITIGATION SYSTEM
Filed Oct. 31, 1966  Sheet 1 of 2
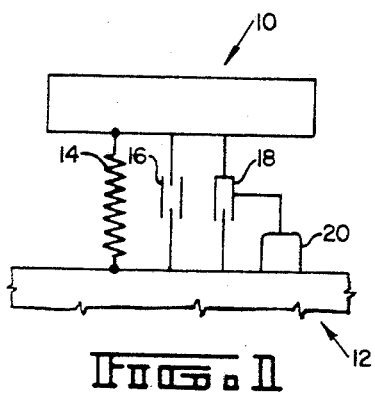
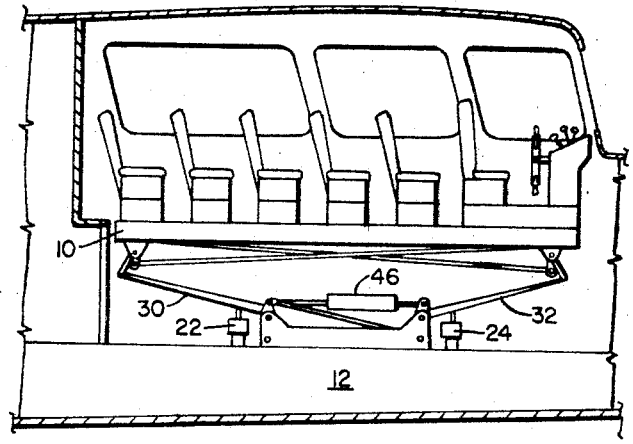
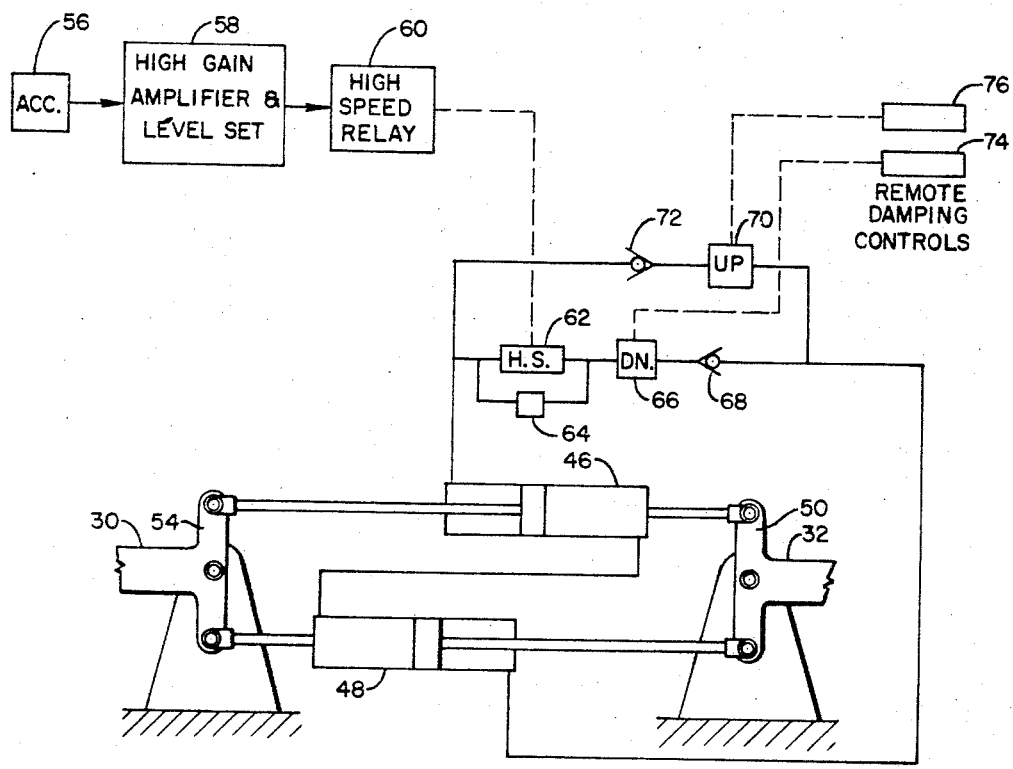
INVENTOR.
HUGO E. GAUSS
RAYMOND V. REAL
VINCENT J. ROSA
Fishman + Van Kirk
ATTORNEYS.

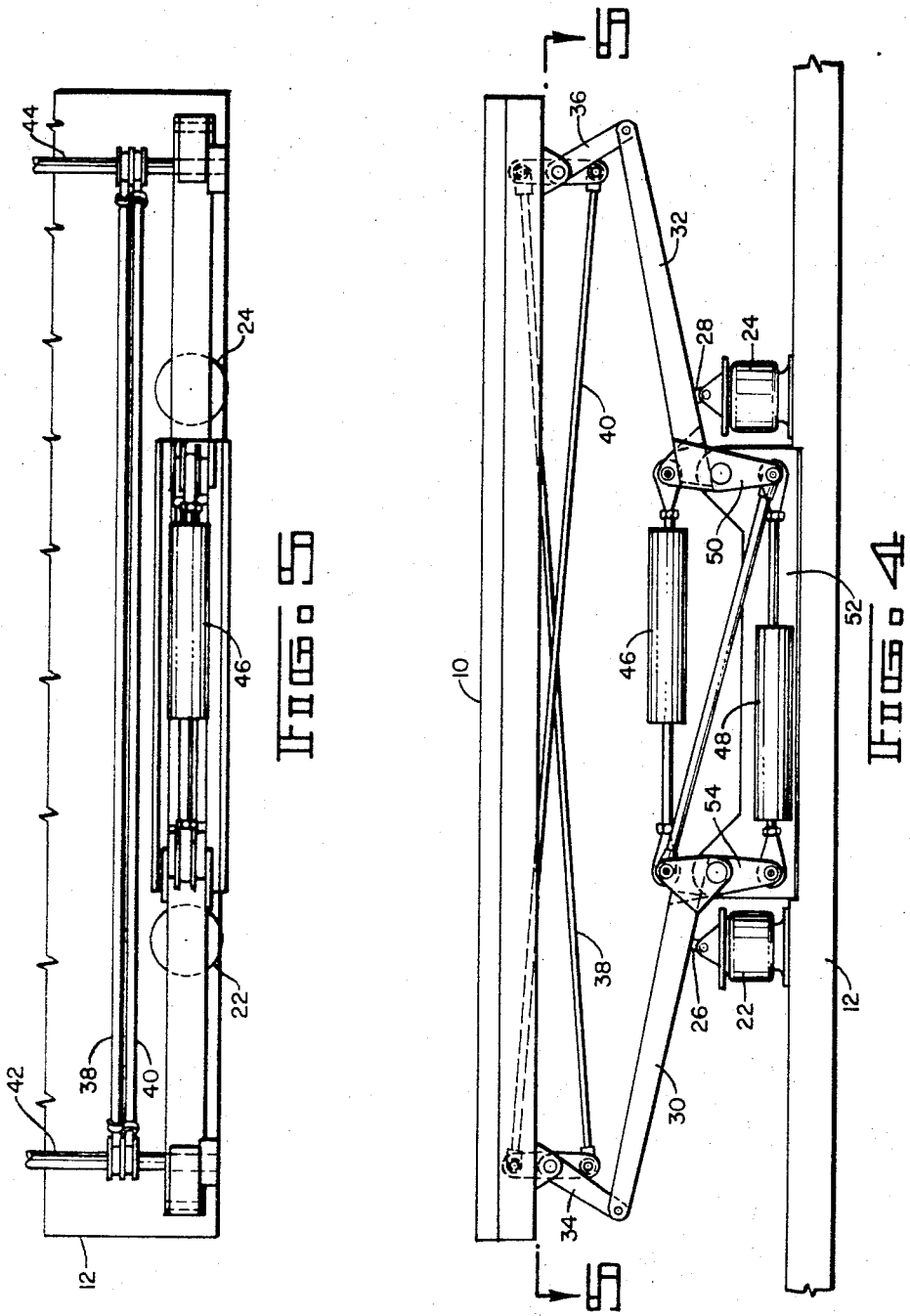

United States Patent Office 3,427,038
Patented Feb. 11, 1969

3,427,038
SHOCK MITIGATION SYSTEM
Hugo E. Gauss, West Hartford, and Raymond V. Real, Glastonbury, Conn., and Vincent J. Rosa, Wellesley Hills, Mass., assignors to United Aircraft Corporation, East Hartford, Conn., a corporation of Delaware
Filed Oct. 31, 1966, Ser. No. 590,604
U.S. Cl. 280—6   13 Claims
Int. Cl. B62d 37/00, 47/00

ABSTRACT OF THE DISCLOSURE

Apparatus for isolating the load supporting portion of a vehicle from the portions thereof which contact the medium over which the vehicle travels, the isolation system comprising first and second shock absorbing means. The second shock absorbing means is normally bypassed and is activated in response to the sensing of a vertical acceleration in excess of a predetermined level to thereby bypass the first and normally operative soft suspension means and to insert a stiff suspension means between the vehicle load supporting and medium contacting portions.

---

The present invention relates to a shock mitigation system for vehicles. More particularly, this invention is directed to a system for providing isolation between a load supporting member and the portions of a vehicle carrying such member which make contact with the medium over which the vehicle is traveling. Accordingly, the general objects of the present invention are to provide new and improved methods and apparatus of such character.

While not limited thereto in its utility, the present invention has been found to be exceptionally useful in providing isolation between the passenger compartment and hull of a high speed boat. Accordingly, in describing the present invention and the problems which it solves, a high speed boat environment will be discussed.

While most pronounced in the case of a high speed planing boat, the conditions against which protection must be provided are the same in any vehicle. These conditions may be classified broadly as vibration and shock. Considering first vibration, it is known that human tolerance to vibration is very limited. For example, chronic injuries may be produced by a vibration exposure of long duration at levels which produce no apparent acute effect. Thus, even under highway vehicular operations, such as experienced with trucks and trailers, chronic minor injuries are common. These range from sacroiliac strain to minor kidney injuries. Studies have shown that long term vibrations in excess of .08 "g's" are generally considered as unpleasant and the basic limit of tolerance is in the range of .1 to .3 "g's" for low frequency vibration. In addition, it should be noted that very long exposure to vibration above the level of perception, .005 "g's" is both irritating and fatiguing.

In the case of shocks (short exposure peaked accelerations), severe discomfort and, at high speeds and sea states, permanent injury becomes a distinct possibility even under short periods of exposure. For further treatment of the subject of human tolerance to shock and vibration, reference may be had to Volume III Chapter 44, of the "Shock and Vibration Handbook" by C. M. Harris and C. E. Crede, published in 1961 by the McGraw-Hill Book Company.

In order to overcome the aforementioned problems and thus provide a compartment in which crew and, in some instances, passengers may safely and comfortably ride, it is necessary to isolate the occupied portion of the vehicle, hereinafter called the platform, from those portions of the vehicle which come in contact with the medium over which the vehicle is traveling. The isolation system is, of course, the suspension system of the vehicle and, in its design, certain criteria must be met. However, from an isolation point of view, the two conditions to be overcome, vibration and shock, are not compatible. Vibration isolation requires a very "soft" system. Conversely, shock isolation requires a "hard" system which may absorb and control relatively high "g" level energy. A further complication arises from the fact that shocks may occur at any particular point of relative platform-vehicle position; such position varying in response to vibration. The effect of shock impulses on the vibration isolation system, unless controlled by some additional system, would be to cause excessive velocity build-up between the platform and the boat hull resulting in high velocity shock should the rattle space limits be reached during this condition. The large rattle space requirements for these extreme environments make it desirable to superimpose the vibbratory and shock rattle space requirements. While this can be accomplished to some extent in a conventional fashion by making the damping velocity sensitive, rattle space is lost during the travel required to reach these velocities. Simple addition of a shock absorption system effective upon overtravel would also increase the rattle space requirements excessively. An additional problem, particularly in the boat environment, is precipitated by the low frequencies of the vibrational input dictated by the operating conditions. In any vibratory system, if attenuation of the input vibration is to be obtained, the natural frequency of the isolated portion of the system must be below the input or driving frequency. Practical design, however, limits the natural frequency of the vibration isolation system to a frequency on the order of 0.4 to 0.5 cycle per second as a lower limit. Ideally, the best isolation is obtained in a system without damping. However, as the input frequency approaches the natural frequency of the system, a condition of resonance results. Thus, as the vehicle speed goes to zero, the input frequency will pass through the resonant frequency and, unless damped, will excite the vibration isolation system to excessive amplitudes (of platform movement). To prevent excessive amplification of the input vibration, as high a value of damping as practical must be used. However, a high damping factor will increase transmission of the input shock accelerations. That is, the use of damping increases the stiffness of the vibration isolation system and thus increases the transmitted acceleration.

To recapitulate, to promote comfortable and safe transportation, the isolation or suspension system which mounts the platform from the surface or terrain contacting portions of the vehicle must reduce the amplitude of vibrations so that the platform is subjected to vibration of less severity than the frame or hull. Because of the very low frequency of the vibratory input energy, a very low natural frequency for the isolation system must be obtained. That is, to obtain vibration isolation, the natural frequency of the isolated system must be below the forcing frequency. Operation of the system with the forcing frequency very close to the natural frequency of the isolated system, which in a boat environment will be the case at low speeds, will result in amplification rather than attenuation unless damping is used. The use of damping increases the stiffness of the system and increases the transmitted acceleration. Thus, means in the form of a shock isolation system must be provided to reduce the transmission of the input shock acceleration to a level which will neither damage equipment nor cause injury to personnel. This requires restricting the platform acceleration to from 1 to 2 "g's" or less regardless of the level of the input acceleration. The major factor in obtaining this degree of shock attenuation is the relative displacement required. Practical rattle space requirements dictate that this displacement be kept to a minimum. In addition, the shock isolation system must be able to dissipate large amounts of energy which may occur as a result of the rather large relative motions, the relatively long duration of the shock pulses and the large mass of the isolated platform.

The present invention overcomes the disadvantages and deficiencies inherent in prior art platform isolation schemes by providing a novel isolation system characterized by automatic damping control. This automatic control system comprises means for sensing vertical acceleration of the surface or terrain contacting portion of the vehicle and generating, in response to accelerations in excess of a predetermined minimum, a control signal. The control signal operates through suitable means to increase the damping of the system to a preselected level, keeping the damping force nearly constant without regard to relative velocity or position, when the acceleration exceeds the predetermined minimum. When the acceleration falls below the minimum, the system operates under normal damping until the onset of another shock pulse with an acceleration level sufficient to cause generation of another control signal. In order to accomplish the foregoing, the suspension or isolation system for the platform comprises relatively soft shock absorbing means, such shock absorbing means being damped so that successive amplification of the input vibration will be limited as the frequency of the vibrations passes through the resonant frequency of the isolation system. Connected in parallel with this soft shock absorbing means is a second shock absorbing means in which normally adds only a slight and preselected amount of damping to the vibratory system. However, the second shock absorbing means operates in response to the generation of a control signal indicative of a hull or frame vertical acceleration in excess of a predetermined minimum to bypass the soft or vibratory system and to provide stiff and nearly optimised response to shocks.

It is therefore an object of the present invention to provide a shock mitigation system for vehicles.

It is another object of the present invention to isolate a load carrying platform from terrain or surface contacting portions of a vehicle.

It is also an object of the present invention to provide an automatic shock isolation system for a load carrying platform mounted on a vehicle.

It is a further object of the present invention to minimize the rattle space requirements for a shock isolation system for vehicles.

It is yet another object of the present invention to simultaneously provide isolation from vibratory and shock inputs for occupants of a vehicle.

It is still another object of the present invention to provide variable damping for a platform isolation system for vehicles.

It is another object of the present invention to provide an automatically controlled vehicle suspension system characterized by variable damping.

It is also an object of the present invention to control the damping of a vehicle suspension system in response to vertical accelerations of the surface or terrain contacting portions of the vehicle.

It is a further object of the present invention to provide a shock mitigation system for boats wherein the load carrying platform is isolated from the hull by means of a suspension system having variable damping, the damping control operating in response to vertical acceleration of the hull.

These and other objects of the present invention are accomplished by novel apparatus, a preferred embodiment of which is shown in the accompanying drawing. Accordingly, this invention may be better understood and its numerous advantages will become apparent to those skilled in the art by reference to the accompanyng drawings wherein like reference numerals apply to like elements in the various figures and in which:

FIGURE 1 is a schematic drawing which illustrates the action of the novel isolation system of this invention.

FIGURE 2 is a side view of a preferred embodiment of the present invention mounted on a high speed boat.

FIGURE 3 is a partial schematic view of the preferred embodiment of the present invention shown in FIGURE 2, including circuitry which accomplishes automatic control.

FIGURE 4 is an enlarged side view of the preferred embodiment of the present invention depicted in FIGURE 2.

FIGURE 5 is a top view of the apparatus shown in FIGURE 4.

Before describing and explaining the apparatus depicted in the drawing, a typical environment will be discussed. As noted above, this example environment will be a high speed planing boat. With such a boat traveling at 55 knots with the sea condition sea state 3, shock pulses of a quasi-sinusoidal form occurring at nearly regular intervals as an enlargement of one cycle of the regular vibrational input are experienced. The vibrational input is generally steady and a direct function of the speed of the craft and the sea state. The wave form of the vibrations is also generally sinusoidal and, in a typical instance, the maximum value thereof was estimated to be 1.75 "$g$'s" at 1.4 c.p.s. for the aforementioned 55 knots and sea state 3. The superimposed shock pulses produced a positive value of platform acceleration with an average value of about 5 "$g$'s." The maximum peak value of shock pulses is in the range of 8 "$g$'s" and the duration of these pulses is on the order of .1 to .2 second. The shock pulses, as noted above, may occur at any portion of a cycle of the vibratory input and, if in phase therewith, may produce an effective shock pulse on the platform of maximum peak value approaching 10 "$g$'s." Major shocks, under the example conditions being described, occur about every 5 to 10 seconds. The combined shock and vibrational input waveforms, while complex, can be defined as a sinusoidal negative acceleration followed by a nearly straight line acceleration to the maximum "$g$" level and thereafter an exponential decay. In order to compensate for the 1.75 "$g$'s" vibratory input, the rattle space requirements are on the order of several feet and simple snubbing of platform movement is complicated by the fact that the platform may acquire considerable velocity relative to the boat hull. Rattle space requirements in order to compensate for shock inputs with a soft (vibration) isolation system would dictate a rattle space in execess of 10 feet.

As may be seen from the foregoing, the principal objective of the isolation system is the reduction of the amplitude of the vibrational and shock input so that the platform is subjected to vibration and shocks of less severity then the boat hull. Referring now to FIGURE 1, the platform is indicated schematically at 10 while the boat hull or other vehicle terrain or surface contacting portion is indicated at 12. As will be seen, the entire system may be considered analogous to a mass, spring, damper system excited by motion of the support. Physical requirements dictate that the isolation system use the same rattle space for both vibration and shock isolation and thus the system must prevent excessive platform velocity build-up. To accomplish the foregoing, the isolation system of the present invention utilizes a spring-damper arrangement which might comprise spring 14 and damper 16 to provide vibration isolation between platform 10 and hull 12. Connected in parallel with the spring-damper arrangement is a shock absorber means shown schematically in FIGURE 1 as a shock cylinder 18 and control means 20 therefor.

During vibration isolation, that is with "$g$" loads of less than approximately 2 "$g$'s," the shock cylinder 18 is at least partially bypassed by a system of valves in control 20. This allows the piston in the shock cylinder to travel relatively freely. Under these conditions, shock cylinder to travel relatively freely. Under these condiiton, shock cylinder 18 merely provides slight additional damping to the vibratory isolation system comprising spring 14 and damper 16. When a shock pulse exceeds the predetermined 2 "g's" level, an accelerometer located on the hull 12 (in control 20) triggers an electronic relay system which closes the shock cylinder bypass means. As will be obvious to those skilled in the art, since the total duration times of shocks over 2 "g's" are very small, .1 to .2 second being typical, the switching and valving action must occur very rapidly. Restated, high speed operation of the shock cylinder is desirable to conserve rattle space since the boat and platform will move together rapidly until the relatively stiff shock system is effective. Since the relative velocity of closing is on the order of 100 inches per second, it is desirable to accomplish the switching and valving action very rapidly, 10 milliseconds or less being desirable. Closing of the bypass means for cylinder 18 results in the vibratory system being bypassed and the platform is accelerated at a near constant "g" level determined by the setting (damping) provided by cylinder 18. As soon as the shock input decays below the 2 "g" level, the shock cylinder 18 will again be bypassed and normal vibratory isolation by means of damped spring 14 will resume. Thus, during operation with only vibrational input energy, the platform 10 is isolated from the hull 12 by a conventional spring-damper arrangement and the shock absorber is essentially bypassed and thus offers little resistance to movement of the platform. However, upon the onset of a large boat acceleration, the high acceleration level is sensed by a sensor in control 20 and a signal is generated which causes shock absorber 18 to be actuated. Actuation of the shock absorber puts a nearly constant force system into action thereby maximizing energy consumption and minimizing relative platform-boat displacements for equivalent "g" load experience on the platform. This action permits the isolation of passengers and equipment while maintaining practical platform excursions.

Turning now to FIGURE 2, a preferred embodiment of the present invention mounted on a high speed planing boat and providing isolation between the hull 12 and platform 10 upon which the crew and passenger seats of such boat are mounted is shown. The embodiment of FIGURE 2 may be more clearly seen from the enlarged view of FIGURE 4 which shows the system as installed at one side of the platform. The isolation system comprises two pair of air springs, only one pair 22 and 24 being shown. Springs 22 and 24 are mounted on hull 12 and are respectively pivotably connected via linkages 26 and 28 to arms 30 and 32. Arms 30 and 32 are respectively pivotably connected to platform 10 by linkages 34 and 36. During relative movement between platform 10 and hull 12, the platform is maintained level by means of a crossed pair of linkages 38 and 40 which, in the usual instance, comprise cables. Cables 38 and 40 are affixed to platform 10 in the manner clearly seen from FIGURE 5. In the usual installation, the isolation device of FIGURES 4 and 5 is, as shown in FIGURE 2, situated such that cables 38 and 40 run between the front and rear of the platform 10. The cables thus insure that the platform will not tip forward or backward. To prevent tilting to either side, a pair of torque tubes 42 and 44, as also may best be seen from FIGURE 5, extend from the port to starboard side of platform 10 at both the front and rear of the platform.

The lower ends of arms 30 and 32 are interconnected, as may best be seen from FIGURES 3 and 4, by a pair of oppositely oriented hydraulic shock absorbers 46 and 48. The end of the piston shaft of shock absorber 48 and the body of shock absorber 46 are pivotably connected to opposite ends of a linkage 50 which is in turn pivotably attached to a bracket 52. The end of arm 32 is welded or otherwise rigidly affixed to linkage 50. Similarly, the end of the piston shaft of shock absorber 46 and the body of shock absorber 48 are connected to opposite ends of a linkage 54 which is also pivotably attached to bracket 52 which is rigidly connected to the boat hull 12.

The automatic control portion of the present invention may be seen by reference to FIGURE 3. The automatic control consists of an accelerometer 56, amplifier means 58, a high speed relay 60 and a fast response hydraulic control system. Amplifier 58 may be of any type well known in the art which is adjustable to provide an output signal when the input signal exceeds a preset level. Typically, amplifier means 58 will comprise a high gain amplifier, adjustable attenuator and trigger circuit. Upon receipt of a signal from accelerometer 56 of a magnitude commensurate with an acceleration in excess of a predetermined level, usually 2 "g's," a signal will be passed to the trigger circuit which will cause a control signal to appear at the output terminals of the amplifier means. This control signal will be of sufficient magnitude to actuate relay 60. Accelerometer 56 is typically mounted on the keel directly below the isolation system to be controlled or on a hard surface in an area providing representative acceleration. Amplifier means 58 and relay 60 are typically mounted on the isolated system (platform 10) and the hydraulic control system, although not shown so mounted in FIGURES 4 and 5, will be located integrally with the shock absorbing cylinders 46 and 48. By mounting accelerometer 56 on the keel or hull of the vehicle, rleative movement between platform 10 and boat 12 may be anticipated. That is, additional damping, if necessary, will be placed in the isolation system in advance of large relative travel of the platform 10 relative to boat hull 12.

The hydraulic control system comprises a high speed valve 62 and, in parallel therewith, a bypass valve 64. Bypass valve 64 may be a conventional adjustable poppet or adjustable relief valve. In series with valves 62 and 64 is a damping control valve 66 and a check valve 68. In parallel with the system comprising valves 62, 64, 66 and 68 are series connected adjustable damping control valve 70 and check valve 72. If desired, damping control valves 66 and 70 may be manually adjusted by means of respective remote damping controls 74 and 76.

Prior to the onset of a shock input, high speed valve 62 is open and thus fluid can circulate relatively freely through shock absorbers 46 and 48 as the pistons are moved as a result of the action of springs 22 and 24. That is, with a vibrational input only, springs 22 and 24 tend to isolate platform 10 from vertical movements of hull 12 and, in so doing impart limited movement to the pistons in shock absorbers 46 and 48 respectively via arms 32 and 30. Depending on the setting of damping control valves 66 and 70, shock absorbers 46 and 48 provide a preselected amount of damping for the vibration isolation system during downward and upward relative movement between the hull and platform. When the acceleration of hull 12 exceeds a predetermined level, accelerometer 56 will provide a signal of sufficient magnitude to cause amplifier means 58 to generate a control signal for relay 60. Relay 60 will thus close and actuate the high speed hydraulic valve 62. With the closing of valve 62, the damping in the system will be increased by a factor determined by the orfice size of bypass valve 64. Thus, upon the onset of a shock input greater than a predetermined magnitude, the damping of shock absorbers 46 and 48 will be increased and the shock absorbers will be predominant in the isolation of platform 10 from hull 12. When the acceleration falls below the predetermined level, relay 60 and valve 62 will open thus allowing the shock isolation system to operate under the normal damping until the onset of another shock pulse with an acceleration level sufficient to repeat the sequence above described.

In general, under the action of a steady state input from rough seas, the platform and hull motions are out of phase. At the onset of a shock pulse, the platform will generally be above midposition and starting down. If additional damping is not supplied by the automatic control systems of the present invention, and motion actuation is accepted, the upward excursion of the hull will be sufficient at the preset damping rate as determined by the damping imparted by shock absorbers 46 and 48 (by action of control valves 66 and 70) to cause the platform to try to exceed the allowable travel. Accordingly, without the damping control of the present invention, the platform would be stopped by the final stops at a relatively high acceleration thus causing probable injury to personnel and equipment. By sensing the onset of a shock pulse and automatically increasing the damping rate, the higher damping will be in effect before excessive relative velocity build-up has occurred and at a level sufficient to keep the platform travel within the travel limits and maintain the platform acceleration at an acceptable level. An additional important advantage achieved by employment of the present invention is that the present isolation system greatly reduces the travel space (rattle space) required to provide adequate isolation between the platform and hull.

While a preferred embodiment has been shown and described, various modifications and substitutions may be made without departing from the spirit and scope of this invention. For example, the system shown schematically in FIGURE 1 could be employed on each corner of the platform to be isolated rather than employing the system of FIGURES 2 through 5 at two sides of the platform. Accordingly, it is to be understood that the present invention has been described by way of illustration and not limitation.

What is claimed is:
1. A shock mitigation system for vehicles having a load supporting member carried thereon, the load supporting member being mounted for limited movement relative to a portion of the vehicle which makes contact with the medium over which the vehicle is traveling, said movement being the result of forces generated through contact between said vehicle portion and irregularities in the surface of said medium, said shock mitigation system comprising:
first shock absorbing means affixed to a portion of the vehicle which makes contact with the medium over which the vehicle travels, said first shock absorbing means also being connected to and supporting the load supporting member;
fluid damped shock cylinder means, said shock cylinder means being connected to the medium contacting portion of the vehicle and also being connected to the load supporting member;
valve means for providing a low resistance path for shock cylinder means fluid prior to the onset of a shock whereby said shock cylinder means is substantially bypassed and the damping of the isolation system is determined by the characteristics of said first shock absorbing means;
valve control means connected to said valve means for changing the state of said valve means to increase the shock cylinder means fluid flow path resistance;
means operatively connected to a medium contacting portion of the vehicle for sensing vertical accelerations thereof and for generating signals commensurate with such vertical accelerations;
means responsive to said signals commensurate with said vertical acceleration for generating damping control signals when said signals commensurate with acceleration exceed a predetermined level; and
means for applying said damping control signals to said valve control means to activate said valve means thereby increasing the damping of the isolation system in response to the occurrence of shocks greater than a predetermined magnitude as indicated by the sensing of vertical acceleration in excess of said predetermined level.

2. The apparatus of claim 1 wherein said valve means comprises:
first normally open valve means, said first normally open valve means being closed in response to the actuation of said valve control means; and
bypass means connected in parallel with said first normally open valve means, said bypass means imparting a constant and predetermined resistance to the flow of shock cylinder means fluid upon the closing of said first normally open valve means.

3. The apparatus of claim 2 further comprising:
second means for varying the damping of said second shock absorbing means, said second damping varying means being connected in series with said parallel connected first normally open valve means and said bypass means, said second damping varying means being adjustable to provide a predetermined amount of resistance to said shock cylinder fluid of said second shock absorbing means with said first valve in the open position, whereby said second shock absorbing means contributes to the damping of said shock mitigation system at all times.

4. The apparatus of claim 2 wherein said first shock absorbing means comprises:
at least a first pair of spring means.

5. The apparatus of claim 2 further comprising:
means for maintaining the load supporting member level as it moves vertically while supported by said shock mitigation system.

6. The apparatus of claim 2 wherein said second shock absorbing means comprises:
at least a first pair of oppositely oriented fluid damped shock cylinders, the piston in one of said cylinders being connected to the body of the other of said cylinders by a first linkage which is pivotably mounted on said medium contacting vehicle portion, the piston in the said other of said cylinders being connected to the body of said one of said cylinders by a second linkage which is pivotably mounted on said medium contacting vehicle portion;
means pivotably connecting said first linkage to the load supporting member of the vehicle adjacent a first side thereof; and
means pivotably connecting said second linkage to the load supporting member of the vehicle adjacent a second side thereof.

7. The apparatus of claim 6 further comprising:
means connected between said means pivotably connecting said first and second linkages to said load supporting member for maintaining said load supporting member level.

8. The apparatus of claim 2 wherein said bypass means comprises:
first normally closed valve means, said first normally closed valve means being pressure responsive and having a predetermined orifice size, said first normally closed valve means being opened in response to an increase in shock cylinder means fluid pressure when said first normally open valve means is closed, the size of the orifice in said first normally closed valve means determining the damping of said system when experiencing shocks greater than said predetermined magnitude, said damping being substantially constant when the vertical acceleration of the medium contacting vehicle portion exceeds a predetermined minimum.

9. The apparatus of claim 8 further comprising:
second means for varying the damping of said second shock absorbing means, said second damping varying means being connected in series with said parallel connected first normally open valve means and said bypass means, said second damping varying means being adjustable to provide a predetermined amount of resistance to said shock cylinder fluid of said second shock absorbing means with said first valve in the open position, whereby said second shock absorbing means contributes to the damping of said shock mitigation system at all times.

10. The apparatus of claim 6 wherein said first shock absorbing means comprises:

at least a first pair of spring means; a first end of each of said spring means being affixed to a medium contacting portion of the vehicle, a second end of a first of said spring means being pivotably connected to said means connecting said first linkage to the load supporting member, a second end of the second of said spring means being pivotably connected to said means connecting said second linkage to the load supporting member.

11. The apparatus of claim 10 further comprising:

means connected between said means pivotably connecting said first and second linkages to said load supporting member for maintaining said load supporting member level.

12. The apparatus of claim 11 wherein said bypass means comprises:

first normally closed valve means connected in series with one of said shock cylinders, said first normally closed valve means being pressure responsive and having a predetermined orifice size, said first normally closed valve means being opened in response to an increase in shock cylinder fluid pressure when said first normally open valve means is closed, the size of the orifice in said first normally closed valve means determining the damping of said system when experiencing shocks greater than said predetermined magnitude, said damping being substantially constant when the vertical acceleration of the medium contacting vehicle portion exceeds a predetermined minimum.

13. The apparatus of claim 12 further comprising:

second means for varying the damping of said second shock absorbing means, said second damping varying means being connected in series with said parallel connected first normally open valve means and said bypass means, said second damping varying means being adjustable to provide a predetermined amount of resistance to said shock cylinder fluid of said second shock absorbing means with said first valve in the open position, whereby said second shock absorbing means contributes to the damping of said shock mitigation system at all times.

References Cited
UNITED STATES PATENTS

| | | | |
|---|---|---|---|
| 3,208,760 | 9/1965 | Lucien | 280—6 |
| 3,124,368 | 3/1964 | Corley | 280—6 |
| 2,992,837 | 7/1961 | Rabow | 280—124 |

PHILIP GOODMAN, *Primary Examiner.*

U.S. Cl. X.R.

280—124